E. T. LARKIN.
REVERSING GEARING.
APPLICATION FILED JULY 29, 1916.

1,291,560.

Patented Jan. 14, 1919.
2 SHEETS—SHEET 1.

Inventor
Elwood T. Larkin
by Cooper & Cobb
Attorneys.

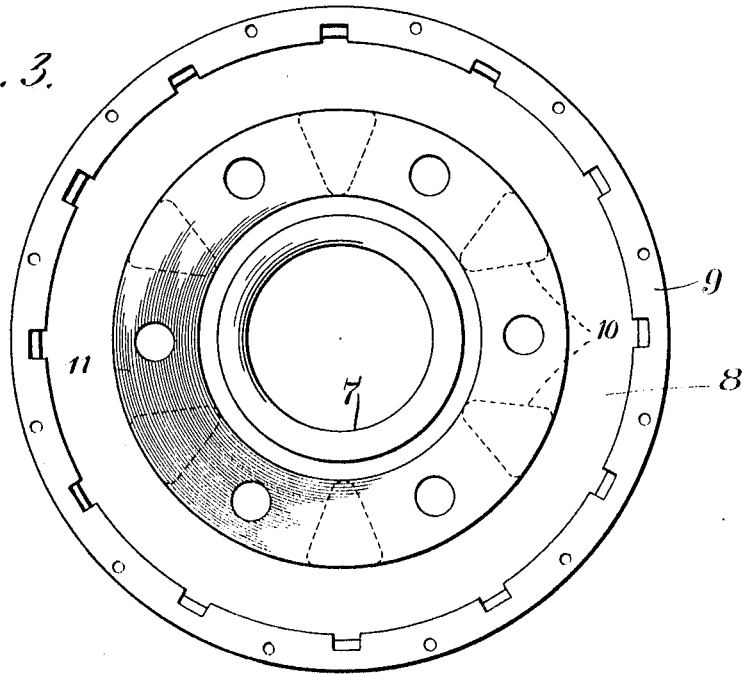
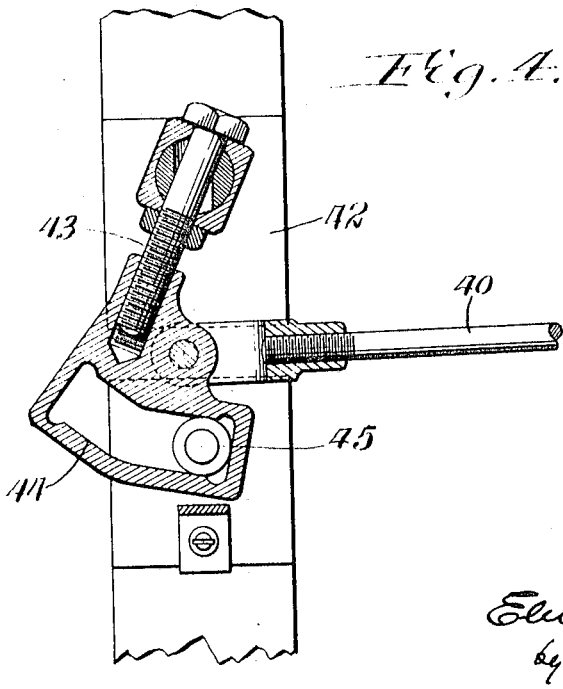

UNITED STATES PATENT OFFICE.

ELWOOD T. LARKIN, OF BUFFALO, NEW YORK, ASSIGNOR TO STERLING ENGINE COMPANY, OF BUFFALO, NEW YORK, A CORPORATION OF NEW YORK.

REVERSING-GEARING.

1,291,560.

Specification of Letters Patent.   Patented Jan. 14, 1919.

Application filed July 29, 1916.   Serial No. 112,001.

*To all whom it may concern:*

Be it known that I, ELWOOD T. LARKIN, a citizen of the United States, residing at Buffalo, in the county of Erie and State of New York, have invented new and useful Improvements in Reversing-Gearing, of which the following is a specification.

This invention relates to a reversing gearing or mechanism by means of which a driven shaft may be turned in one direction or the other from a driving shaft turning constantly in one direction.

The object of the invention is to provide a high duty reverse gear, more particularly adapted for power boats, which without overheating the reverse gear will permit the propeller shaft to readily be either driven ahead or reversed for a protracted period with the motor turning over at maximum speed and with which the change in either direction may be made almost instantly without jar, noise or unduly straining the operating parts.

Figure 1:
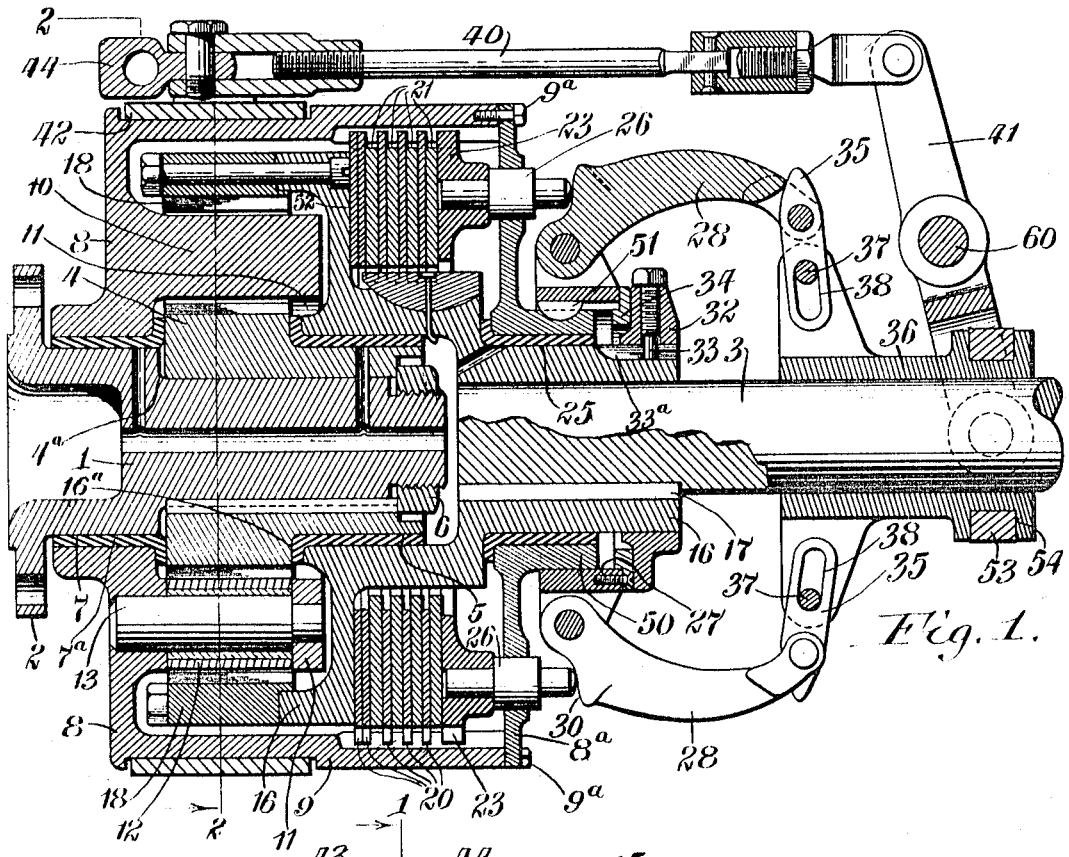
Figure 2:
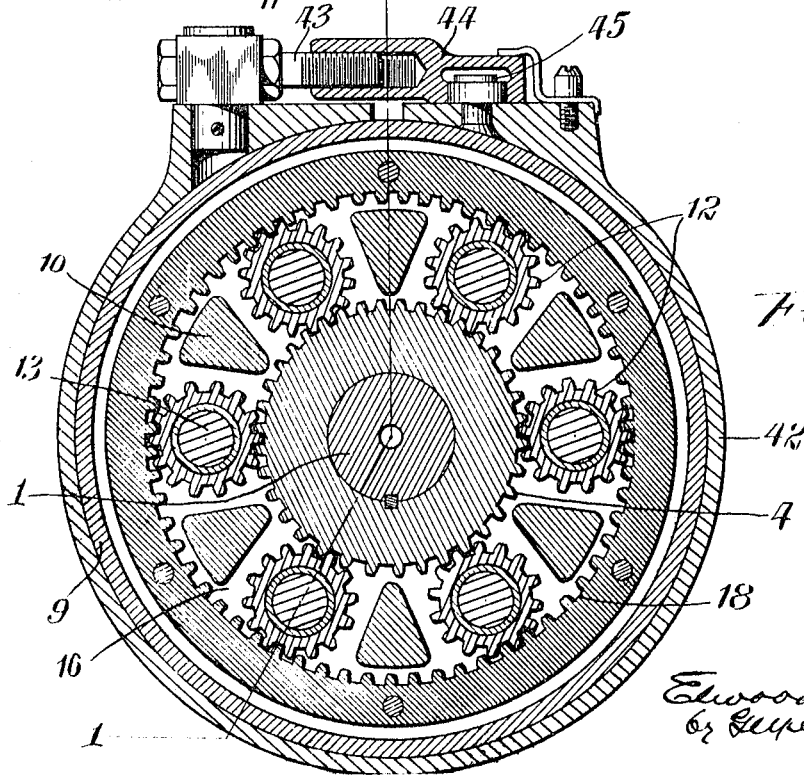

In the accompanying drawings:

Figure 1 is a vertical longitudinal section of my improved reverse gear taken on line 1—1, Fig. 2. Fig. 2 is a vertical transverse section taken on line 2—2, Fig. 1. Fig. 3 is an end elevation of the main cylindrical part of the inclosing casing. Fig. 4 is a fragmentary sectional view of the brake operating mechanism forming part of the reversing gearing.

Similar characters of reference indicate corresponding parts throughout the several views.

1 represents a power or driving shaft provided at its front end with a suitable flange 2 for connecting the same to a gasolene motor or other power source and 3 represents the driven or propeller shaft axially in line with said power shaft. The object of the reverse gear is to cause this driven shaft to rotate in one direction or the other, as desired, while said power shaft is turning constantly in one direction. 4 is a longitudinal external gear arranged on said power shaft behind the flange 2 and provided with a long rearwardly extending hub which forms a longitudinal external journal 5. This external gear is keyed on the power shaft and held against longitudinal displacement thereon by means of a shoulder $4^a$ formed on the power shaft and bearing against the front end of this gear and a retaining nut 6 engaging a screw thread on the rear end of said power shaft and bearing against the rear end of said external gear so that the latter is clamped on the power shaft and caused to turn as a unit therewith.

Between the external gear and the flange 2 of the power shaft, said latter is provided with an external longitudinal journal 7 which receives the forward bearing $7^a$ formed on the front head 8 of an inclosing casing. The latter is provided with an outer cylindrical body 9 which is preferably formed integrally with the front head 8 and is also provided with a rear head $8^a$ detachably connected with the body by screws $9^a$ so as to form an inclosure for those parts of the reverse gear which must work in an oil bath. The rear face of said front head engages the front face of the external gear so that said casing is thereby retained against backward motion. Arranged in an annular row around the external gear 4 are a plurality of longitudinal posts 10 extending rearwardly from the front head 8 and preferably formed integral therewith. These posts on their rear ends, together carry a ring or annular bridge 11 which surrounds the external gear 4 and which is preferably formed integral with said posts and the front head and body of the inclosing casing. Retained between the front face of said ring 11 and the rear face of the front head 8 is an annular row of longitudinally disposed pinions 12 which are borne by a plurality of longitudinal stub shafts 13 and engage their inner sides with said external gear 4. Said pinion shafts are supported at their front and rear ends by said front head of the casing and by the ring 11 respectively, so that it is impossible to distort the alinement of said pinions, and when the casing rotates said stub shafts rotate therewith.

Turning on the journal 5 at the rear of the hub of the external gear 4 is a supporting sleeve or member 16 that is fixedly mounted by means of a key 17 or otherwise to the forward ends of the propeller shaft 3. To the forward face of said supporting sleeve or member is secured an internal gear 18 whose teeth engage with the outer teeth of the pinions 12. This supporting sleeve 16 and therefore also the driven or propeller shaft 3 to which it is secured are prevented from moving forwardly relative to the power shaft 1, inasmuch as the front end or face 16ª of the hub of said supporting sleeve engages the rear side of the external gear 4 which in turn is secured to said power shaft.

When it is desired to hold or lock the inclosing casing against rotation, a brake rod 40 is moved rearwardly by a main actuating lever 41 thereby causing a split brake band 42 which is arranged around the outside of the containing casing, to contract and frictionally grip said casing. With said casing stationary and of course the stub shafts 13 likewise, the pinions are caused to be rotated by the external gear 4 and, being in mesh with both said external gear and the internal gear 18, the latter and hence also the driven shaft 3 are caused to rotate in a direction opposite to that of the power shaft.

The movement of the brake rod may be transmitted to the brake band by any suitable means, for instance, those shown in the Figs. 1, 2 and 4, and comprising a longitudinally oscillating brake arm 43 pivoted on one end of the brake band and connected with the brake rod 40 and provided with a cam 44 which receives a pin or lug 45 on the other end of the brake band. Upon turning the cam 44 in one direction the brake band is tightened and grips the casing so as to hold the same against turning while upon turning this cam in the opposite direction the brake band is permitted to expand and release the casing so that it is free to turn.

When it is desired to put on the forward speed, i. e., to cause the driven shaft to rotate in the same direction as the driving or power shaft, it is necessary to couple the inclosing casing 8 and the supporting sleeve or member 16 and this is accomplished as follows:

Two sets of clutch plates are arranged in the rear end of the inclosing casing, the outer set 20 being splined to said inclosing casing so as to rotate therewith but be capable of longitudinal movement thereto and the plates 21 of the other set being splined to the supporting sleeve 16. Arranged against the rearmost clutch plate is a friction ring 23 which is splined to the inclosing casing. The rear head 8ª of said casing is suitably journaled on a bearing 25 arranged on the rearwardly extending hub of the supporting sleeve 16. Arranged to slide longitudinally in said rear casing head are a plurality of longitudinal pressure studs 26 having their front or inner ends preferably secured to the friction ring 23. On the rearwardly extending hub 50 of the rear casing head 8ª and splined to the same is a fulcrum ring 27 which can move longitudinally on said hub but is constrained to rotate therewith by a spline 51. Pivoted to said fulcrum ring 27 so as to swing laterally thereon are a number of clutch levers 28 which are provided with the outwardly extending noses 30 adapted to bear against the rear end of said pressure studs 26. When these levers are moved outwardly, they tend to press the clutch plates against an abutment 52 on the supporting sleeve and also to move the fulcrum ring backwardly, hence by limiting the backward movement of said ring, the clutch action may be properly adjusted. This is accomplished by providing an adjusting collar 32 which surrounds the hub of the supporting sleeve and is longitudinally adjustable thereto but prevented from rotating therewith by means of a set screw 33 passing through said collar into a keyway 33ª formed on the hub of said clutch member. To prevent excessive forward movement of the fulcrum ring, a detaining ring 34 is preferably provided which is secured to the rear end of the fulcrum ring and which bears against the rear end of the hub of the rear casing head when said fulcrum ring is in its extreme forward position.

The clutch levers may be opened up by any suitable means, those shown comprising two pressure links 35 whose outer ends are pivotally connected with the rear ends of the clutch levers and a slidable clutch sleeve 36 surrounding the driven shaft which sleeve may be caused to move one way or the other along said shaft, by properly moving the main actuating lever 41 and which is slidingly connected with the inner ends of said pressure links by means of pins 37 arranged on the clutch sleeve and engaging with slots 38 in the inner ends of said links, as shown in Fig. 1. The actuating lever 41 may be fulcrumed on any suitable support 60 and its inner arm is connected with a ring 53 which turns in a circumferential groove 54 in the clutch sleeve 36, thereby causing the clutch and the brake band to become operative alternately upon turning the actuating lever 41 in one direction or the other. The adjusting collar cannot, of course, turn in unison with the inclosing casing or the fulcrum ring 27 until the clutch has been fully engaged and up to that time the usual tendency is for the heavy friction to cause the clutch levers to break at their pivotal supports. This dangerous tendency has been eliminated in this improved reverse gear due to the fact that said adjusting ring can only tend to turn the fulcrum ring itself and this is strongly splined to the inclosing casing itself. The reverse gear, will therefore stand the most severe strains.

It should be noted that when the reverse gear members are rotating all the bearings which carry said rotating members are small in diameter, which permits of a much slower relative speed of travel between the surfaces of the journals and their respective bearing surfaces, thereby greatly decreasing the frictional resistance in these bearings. This feature of construction is important because it is the heat of friction which causes bearings to melt. Furthermore, to prevent the bearings from seizing the journal a certain safety allowance must always be made in their diameters to compensate for any swelling of the journals that may result when the bearings are run when dry and gritty and the larger the bearings, the more this allowance must be and hence the more the looseness of the bearings and the less accurate the alinement of the power and driven shafts when the reverse gear is running cool and in normal order. In any case the friction clutches must always generate a certain amount of heat even though they are not dragging or slipping, so that heating is a constant problem which requires attention. Moreover power and driven shafts are reliably maintained in accurate alinement under all conditions, the pinions cannot be thrown out of parallelism, the clutch operates smoothly and easily because none of the heavy parts of the reverse gear are moved in its manipulation, there are no unnecessary or excessively large bearings and the parts may be manufactured at low cost and readily assembled and dismembered for inspection, adjustment or repairs.

I claim as my invention:

1. A reversing gearing comprising a driving shaft, a driven shaft, an external gear connected with the driving shaft, an inclosing casing provided on one side of its axis with a pinion meshing with said external gear and journaled on said driving shaft, a supporting sleeve secured to the driven shaft and journaled on the driving shaft and provided with an internal gear meshing with said pinion, two sets of clutch plates keyed respectively to said supporting sleeve and said inclosing casing, a pressure stud slidably mounted on said inclosing casing and adapted to press said plates against said supporting sleeve, and means for holding the inclosing casing stationary.

2. A reversing gearing comprising a driving shaft, a driven shaft, an external gear connected with the driving shaft, an inclosing casing provided on one side of its axis with a pinion which meshes with said external gear and journaled on said driving shaft, a supporting sleeve secured to the driven shaft and journaled on the driving shaft and provided with an internal gear meshing with said pinion, two sets of clutch plates splined respectively to said supporting sleeve and said inclosing casing, a pressure stud slidably mounted on said inclosing casing and adapted to press said plates against the supporting sleeve, a fulcrum ring rotatably mounted on said inclosing casing, a clutch lever pivoted on said fulcrum ring and arranged to bear against the pressure stud, means for moving said lever, and means for holding the inclosing casing stationary.

3. A reversing gearing comprising a driving shaft, a driven shaft, an external gear connected with the driving shaft, an inclosing casing provided on one side of its axis with a pinion meshing with said external gear and journaled on said driving shaft, a supporting sleeve secured to the driven shaft and journaled on the driving shaft and provided with an internal gear which meshes with said pinion, two sets of clutch plates splined respectively to said supporting sleeve and said inclosing casing, a pressure stud slidably mounted on said inclosing casing and adapted to press said plates against the supporting sleeve, a fulcrum ring mounted on said inclosing casing so as to be circumferentially rotatable therewith and longitudinally slidable thereon, a clutch lever pivoted on said fulcrum ring and bearing against the pressure stud, an adjusting collar secured to the driven shaft and longitudinally adjustable thereto and bearing against said fulcrum ring, means for moving the clutch lever, and means for holding the inclosing casing stationary.

4. A reversing gearing comprising a driving shaft, a driven shaft, an external gear connected with the driving shaft, an inclosing casing provided on one side of its axis with a pinion meshing with said external gear and journaled on said driving shaft, a supporting sleeve secured to the driven shaft and journaled on the driving shaft and provided with an internal gear which meshes with said pinion, two sets of clutch plates splined respectively to said supporting sleeve and said inclosing casing, a pressure stud slidably mounted on said inclosing casing and adapted to press said plates against the supporting sleeve, a fulcrum ring mounted on said inclosing casing so as to be circumferentially rotatable therewith and longitudinally slidable thereon, a clutch lever pivoted on said fulcrum ring and bearing against the pressure stud, a longitudinally slidable shifting sleeve, a pressure link connecting the shifting sleeve with the clutch lever, a brake band arranged around the inclosing casing and operatively connected with said shifting sleeve, and means for reciprocating said shifting sleeve.

5. A reversing gearing comprising a driving shaft, a driven shaft, an external gear connected with the driving shaft, an inclosing casing provided on one side of its axis with a pinion meshing with said external gear and journaled on said driving shaft, a supporting sleeve secured to the driven shaft and journaled on the driving shaft and provided with an internal gear which meshes with said pinion, two sets of clutch plates splined respectively to said supporting sleeve and said inclosing casing, a pressure stud slidably mounted on said inclosing casing and adapted to press said plates against the supporting sleeve, a fulcrum ring mounted on said inclosing casing so as to be circumferentially rotatable therewith and longitudinally slidable thereon, a clutch lever pivoted on said fulcrum ring and bearing against the pressure stud, adjustable means for limiting the rearward movement of said ring relative to said casing, a friction ring splined to the inclosing casing and adapted to bear against the clutch plates, means for moving said clutch lever, and means for holding the inclosing casing stationary.

6. A reversing gearing comprising a driving shaft, a driven shaft, an external gear secured to the driving shaft, pinions meshing with said external gear, pinion shafts carrying said pinions, a casing provided with supports formed integrally therewith and carrying opposite ends of said pinion shafts, a supporting sleeve connected with said driven shaft and provided with an internal gear meshing with said pinions, means for holding said casing against turning, and means for coupling said casing and supporting sleeve.

7. A reversing gearing comprising a driving shaft, a driven shaft, an external gear secured to the driving shaft, pinions meshing with said external gear, pinion shafts carrying said pinions, a casing provided with a head supporting one end of said pinion shafts, a ring supporting the other ends of said pinion shafts and posts connecting said head and ring, said head, posts and ring being formed in one piece, a supporting sleeve connected with the driven shaft and provided with an internal gear meshing with said pinions, means for holding said casing against turning, and means for coupling said casing and supporting sleeve.

ELWOOD T. LARKIN.